United States Patent
Holmberg et al.

(10) Patent No.: US 9,792,928 B2
(45) Date of Patent: Oct. 17, 2017

(54) TAPE STORAGE DEVICE HAVING AT LEAST ONE REDUNDANT READ DATA ELEMENT

(71) Applicants: Hewlett Packard Enterprise Development LP, Houston, TX (US); Quantum Corporation, Houston, TX (US)

(72) Inventors: Mike Alan Holmberg, Eagle, ID (US); John D. Hampton, Meridian, ID (US); Turguy Goker, Solana Beach, CA (US); Robert Brummet, Louisville, CO (US); JaeWook Lee, Irvine, CA (US)

(73) Assignees: Hewlett Packard Enterprise Development LP, Houston, TX (US); Quantum Corporation, San Jose, CA (US)

( * ) Notice: Subject to any disclaimer, the term of this patent is extended or adjusted under 35 U.S.C. 154(b) by 327 days.

(21) Appl. No.: 13/667,421

(22) Filed: Nov. 2, 2012

(65) Prior Publication Data
US 2014/0126083 A1 May 8, 2014

(51) Int. Cl.
*G11B 5/008* (2006.01)
*G11B 20/10* (2006.01)

(52) U.S. Cl.
CPC .... *G11B 5/00826* (2013.01); *G11B 20/10268* (2013.01); *G11B 5/00886* (2013.01)

(58) Field of Classification Search
CPC . G11B 5/008; G11B 5/00826; G11B 5/00852; G11B 5/00856; G11B 5/00886; G11B 5/4893; G11B 20/10268; G11B 2005/008
USPC .............................. 360/39, 55, 63, 18, 83, 90
See application file for complete search history.

(56) References Cited

U.S. PATENT DOCUMENTS

| | | | | |
|---|---|---|---|---|
| 5,369,652 A * | 11/1994 | Bailey | ................. | G06F 11/1008 360/47 |
| 6,115,217 A * | 9/2000 | Dee | ..................... | G11B 5/00813 360/121 |
| 6,233,109 B1 * | 5/2001 | Melbye | ................ | G11B 15/125 360/63 |
| 6,243,225 B1 * | 6/2001 | Wyman | .................. | G11B 5/584 360/77.12 |
| 6,243,330 B1 * | 6/2001 | Oshima | ................. | G06F 3/0601 369/47.1 |
| 6,246,551 B1 * | 6/2001 | Blatchley | ............... | G11B 33/10 360/271.5 |
| 6,366,422 B1 * | 4/2002 | Daniel | ................... | G11B 5/588 360/76 |
| 7,675,710 B2 | 3/2010 | Kennecken et al. | | |

(Continued)

OTHER PUBLICATIONS

Srinivasan et al., "Evaluation of Error Detection Strategies for an FGPA-Based Self-Checking Arithmetic and Logic Unit," 2008, http://www.vuse.vanderbilt.edu/~robinswh/docs/216_Srinivasan_paper.pdf., pp. 1-9.

*Primary Examiner* — Thomas Alunkal
(74) *Attorney, Agent, or Firm* — Trop, Pruner & Hu, P.C.

(57) ABSTRACT

A technique includes in a data storage device, sensing a plurality of data streams from a track of storage media as the media moves in a given direction using a plurality of read elements such that at least one of the read elements is redundant. The technique includes combining the data streams to generate a data stream indicating data read from the track.

11 Claims, 4 Drawing Sheets

(56) References Cited

U.S. PATENT DOCUMENTS

| | | |
|---|---|---|
| 7,904,793 B2 | 3/2011 | Mokhlesi et al. |
| 8,130,459 B2 | 3/2012 | Sridhara et al. |
| 2003/0090837 A1* | 5/2003 | Ozue .................... G11B 5/4976 360/241.1 |
| 2005/0122623 A1* | 6/2005 | Dee ......................... G11B 5/29 360/121 |
| 2005/0286157 A1* | 12/2005 | Kitahara ................ G11B 5/584 360/77.12 |
| 2007/0030594 A1* | 2/2007 | Biskeborn ............ G11B 5/3945 360/129 |
| 2007/0255999 A1 | 11/2007 | Risse |
| 2009/0213488 A1* | 8/2009 | Saliba .................... G11B 5/584 360/77.12 |
| 2010/0095190 A1 | 4/2010 | Kanaya |

* cited by examiner

TAPE STORAGE DEVICE HAVING AT LEAST ONE REDUNDANT READ DATA ELEMENT

BACKGROUND

A typical computer system may have a backup and recovery system for purposes of restoring data (data contained in one or multiple files, for example) on the system to a prior state should the data become corrupted, be overwritten, subject to a viral attack, and so forth. The backup and recovery system may include mass storage devices, such as magnetic tape drives. A typical magnetic tape drive is capable of reading from and writing to multiple tracks of magnetic media; and the tape drive may employ multiple layers of error correction code (ECC)-based detection and correction.

DETAILED DESCRIPTION

Techniques and systems are disclosed herein, which employ at least one redundant read element (also called a "read head") on a moveable magnetic media-based mass storage device, or "tape drive," for purposes of generating multiple read data streams (two streams, for example) for each track and combining these multiple read data streams to generate a composite read data stream per track, which has a relatively large signal-to-noise ratio (SNR). The tape drive may therefore have one or multiple features that take advantage of this SNR.

For example, due to a relatively large SNR, a tape drive constructed pursuant to the techniques and systems disclosed herein may be more flexible in accommodating a larger number of previous magnetic media versions (or "generations"), even as the data density increases from one generation to the next. As another example, due to a relatively large SNR, a tape drive constructed according to the systems and techniques disclosed herein may have relatively robust features, such as relatively thicker head coatings, thereby imparting a relatively long life to the tape drive. Moreover, the systems and techniques that are disclosed herein may, in general, enhance the drive error detection and correction capabilities of the tape drive, in accordance with example implementations.

Figure 1:
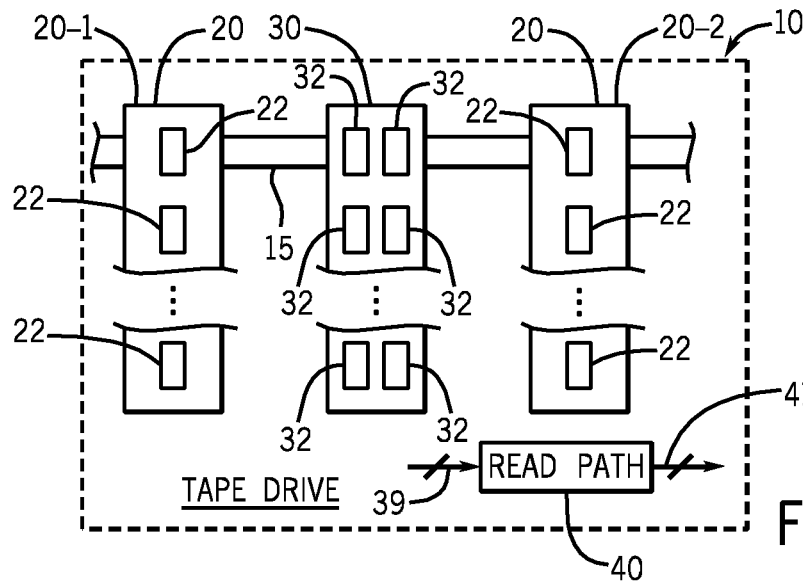
FIG. 1 is a schematic diagram of a tape drive according to an example implementation.

Referring to FIG. 1, as a more specific example, a tape drive 10, in accordance with an example implementation, contains multiple (two, for example) read elements 32 per physical track 15 of the moveable magnetic media. In general, having multiple read data streams per track increases the overall error code correction (ECC) capacity of the tape drive 10. Moreover, multiple read signal streams avoid the correction action, which may otherwise be undertaken if ECC detection indicates errors that may not be recovered using ECC correction. In this manner, without the multiple read streams per track disclosed herein, an alternative approach to reading data that is obscured by random errors may be to stop the tape drive, realign the magnetic media, accelerate the magnetic media back up to speed and then reread the affected portion of the track. Instead of such an approach, however, the multiple read data streams disclosed herein permits the recovery of data due to random errors without physically, rewinding and restarting the tape drive. In this manner, reading the same track twice effectively filters out random errors using ECC detection and/or correction.

More specifically, in accordance with some implementations, the tape drive 10 may use the multiple read data streams in combination with ECC detection and correction schemes for purposes of deriving a composite read data stream that has a relatively high SNR. In an example implementation, the tape drive 10 employs ECC detection for purposes of independently analyzing each of the per track read data streams provided by one of the multiple read elements for purposes of identifying errors in the stream so that the multiple read streams may be combined to remove out the invalid data and retain the valid data.

As an example, for a given segment of the same track, one read element may provide a signal indicative of the following sequence of bytes, or data stream: 01234a6789b0123. For this example, a redundant read element for the same track may provide a signal indicative of the following data stream: 0123a567b9012c. Thus, although ideally both read elements should indicate the same streams of data, the two data streams (such as the ones for this example) may be different due to random errors. For the first example read data stream, "a" and "b" denote corresponding errors, and as can be seen from the second example read data stream, these errors correspond to the correct data of "5" and "0." Continuing the example, the second example read data stream has errors indicated by the "a," "b," and "c" designators.

Comparing the two example streams, the errors in the second read data stream correspond to correct data of "4," "8," and "3," respectively, in the first read data stream. Therefore, by employing ECC detection, the errors may be readily identified, and for this example, the two read data streams may be selectively combined to replace the errant data with valid data to derive the following correct read data stream without even employing ECC correction: 01234567890123.

Although the foregoing example, ECC correction was not used, depending on the particular implementation, ECC correction and detection may both be employed. Moreover, the available ECC bits may be divided between ECC detection and ECC correction, depending on the particular implementation.

Still referring to FIG. 1, as a more specific example, in accordance with an example implementations, the tape drive 10 includes an array 30 of the read elements 32, which may be disposed in a center bump of the tape drive 20. The array 30 has multiple read elements 32 per track 15 (an example track 15 being illustrated in FIG. 1). For the examples disclosed herein, the tape drive 10 includes two read elements 32 per track 15 (i.e., the tape drive 10 has one redundant read element 32 for this example). However, it is understood, that in accordance with other implementations, the tape drive 10 may have more than one redundant read element 32 per track 15, which collectively provide more than the two read data streams per track. Thus, many variations are contemplated, which are within the scope of the appended claims.

In addition to the read element array 30, the tape drive 10, in accordance with an example implementation, further includes two write arrays 20 (write arrays 20-1 and 20-2 being depicted in FIG. 1 as examples), which, as their names imply, are used to magnetically alter given tracks 15 for purposes of writing data onto the magnetic media. For this example, each write array 20 includes one write element 22 per track 15: the write element 22 of the write array 20-1 is used to write data when the magnetic media moves in a given direction; and the write element 22 of the other write array 20-2 is used to write data when the magnetic media moves in the opposite direction. The read elements 32 for a given track 15 may be used in either direction, either to read data or to assist in writing data to the track 15.

As depicted in FIG. 1, the tape drive 10 includes a read path 40, which includes signal lines 39 coupled to the read elements 32 for purposes of receiving signals provided by the read elements 32, which indicate respective streams of read data and signal lines 41 for purposes of providing an SNR-enhanced data stream.

Figure 2:
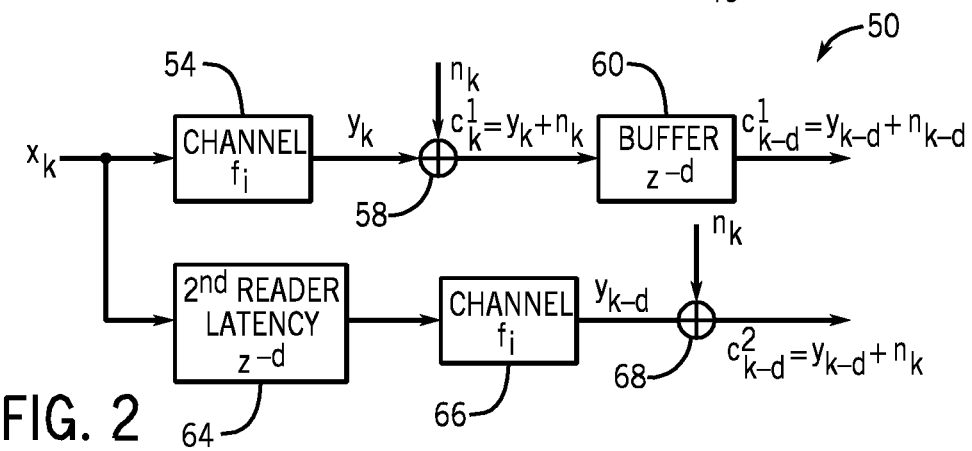
FIG. 2 is a model illustrating processing of signals provided by read elements of the tape drive when sensing the same track of magnetic media according to an example implementation.

More specifically, the read path 41 combines the received data streams, as depicted in FIG. 2, to construct a combined, or composite read data stream (called "$c_{k-d}^{Sum}$" below), as described in the z-domain space below:

$$c_{k-d}^{Sum} = c_{k-d}^1 + c_{k-d}^2 = 2y_{k-d} + n_{k-d} + n_k,$$ Eq. 1 where "$c_{k-d}^1$" represents the read data provided by a first channel 54 coupled to one of the read elements 32 of a given track 15, and "$c_{k-d}^2$" represents the read data stream provided by another channel 66 coupled to the other, read element 32 of the track 15. As depicted in FIG. 2, due to the spatial distance between the read elements 32, a delay (called "$z^{-d}$" in the z domain space of FIG. 2) is introduced, as represented by a latency element 64. As also depicted in FIG. 2, the channel 54 for the other read element 32 includes a buffer 60 to introduce a corresponding $z^{-d}$ delay to align the two signals in time. Moreover, as depicted in FIG. 2, noise (called "$n_k$") is introduced by respective adders 58 and 68 into the channels.

The resulting SNR, called "$SNR^{Dual}$" below, which may be achieved assuming a perfect timing alignment and independent noise between the read elements, may be described as follows:

$$SNR^{Dual} = \frac{P_{signal}}{P_{noise}} = \frac{E[(2y_k)^2]}{E[(n_k + n_{k-d})^2]} = \frac{4 \cdot E[y_k^2]}{E[n_k^2]} = 2 \cdot SNR^{Single},$$ Eq. 2 where "$SNR^{Single}$" represents the SNR of the single read stream provided by a single read element. Therefore, in accordance with example implementations, the two read elements 32 per track 15 effectively double the SNR, as compared to a single read element per track. Although two read elements 32 per track 15 are disclosed herein, the systems and techniques that are disclosed herein may be extended to accommodate more than two read elements 32 per track 15, in accordance with further implementations. In this manner, increasing the number of read elements 32 per track, in general, increases the SNR (e.g., 4.5 dB ideal improvement for three read elements 32 per track 15, as compared to a single read element 32 per track 15). Thus, many variations are contemplated, which are within the scope of the appended claims.

Figure 3:
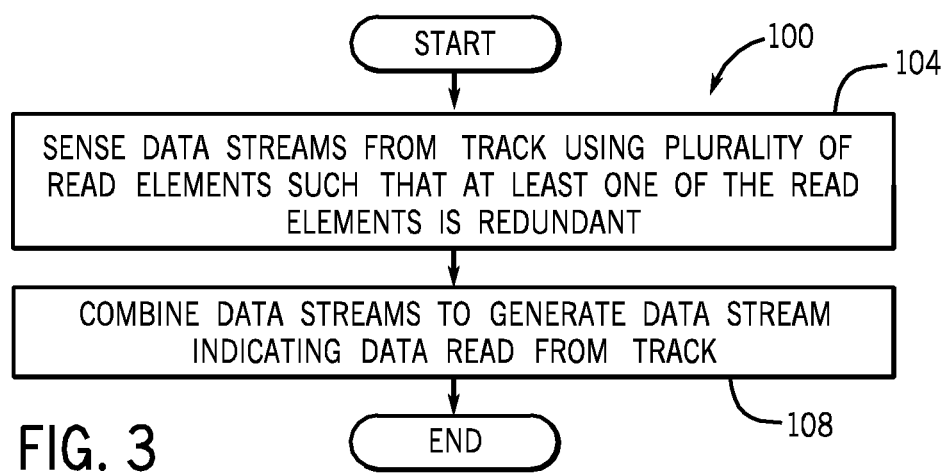
FIG. 3 is a flow diagram depicting a technique to read data from a track of magnetic media using a tape drive that has at least one redundant read element according to an example implementation.

Thus, in accordance with an example implementation, a technique 100 that is depicted in FIG. 3 may be employed with a tape drive to read data from a track of magnetic media. Referring to FIG. 3, the technique 100 includes sensing (block 104) data streams from the track using read elements such that at least one of the read elements is redundant. The technique 100 includes combining (block 108) the data streams to generate a data stream that indicates read data from the track.

Figure 4:
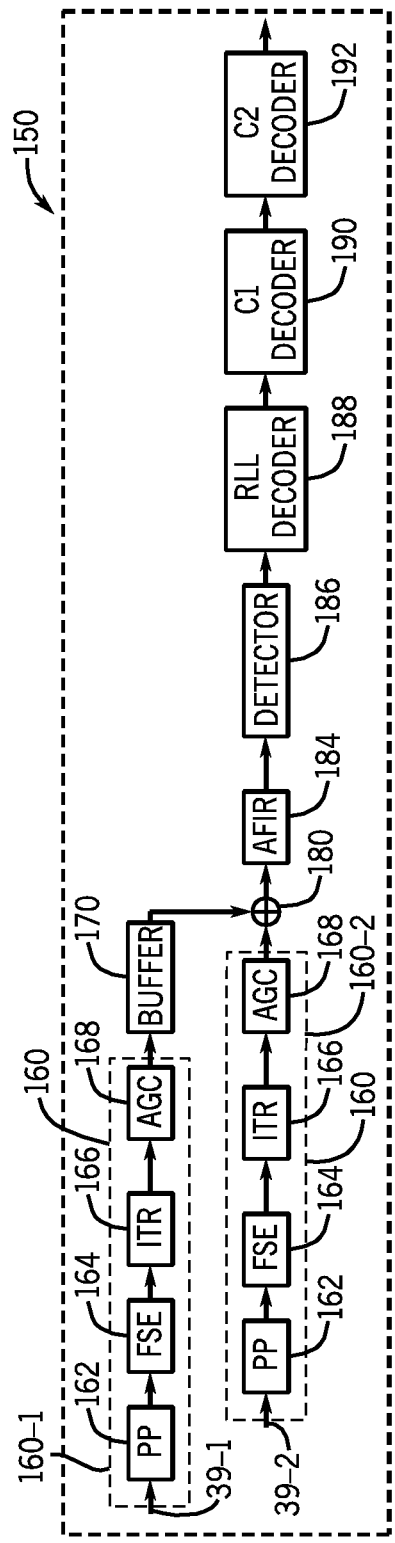
FIGS. 4, 5, 6, 7, 8 and 9 are schematic diagrams illustrating read path architectures for a tape drive according to example implementations.

Referring to FIG. 4, in accordance with an exemplary implementation, the tape drive uses a read architecture 150 for each track 15 (part of the read paths 40 of FIG. 1, for example) for purposes of processing the signals acquired from two read elements 32. For this example, the read path architecture 150 includes a first read channel path 160-1 for purposes of receiving a signal at its input terminal 39-1 corresponding to a read data stream from one of the read elements 32 and another second read channel path 160-2, which receives a signal at its input terminal 32-2 corresponding to a read data stream from the other read element 32. For this example, the channels 160-1 and 160-2 share a common design, referred to by the reference numeral "160" herein.

In general, the channel 160 includes a pre-processor 162, which performs asymmetry correction for the received signal. In this manner, the pre-processor 162 adjusts the positive and negative amplitudes of the received signal relative to each other to correct for any asymmetry. The output terminal from the pre-processor 162, in turn, provides a signal to a finite shape element (FSE) 164, which equalizes and shapes the pulses of the received signal. The signal provided by the FSE 164, in turn, is received by internal time response (ITR) unit 166, which further adjusts the timing of the received pulses. The output of the ITR unit 166 is provided to an automatic gain control 168, which is used to regulate the gain of the signal, and the resulting signal is routed to an adder 180. As depicted in FIG. 4, the channel 160-1 for this example, includes a buffer 170 to compensate for the delay between the read data streams due to the spatial offset between the two read elements 32 per track.

The adder 180 adds the output signals produced by the channels 160-1 and 160-2 to produce a combined signal that is filtered by an asymmetric finite impulse response (AFIR) filter 184. This filtered signal, in turn, is provided to a detector 186, which among its various functions may perform the functions of a Viterbi detector to detect a likely sequence of bits and indicate whether there is a detected timing problem with the signal. The output signal from the detector 186, in turn, may be provided to a run link length (RLL) decoder 188. The output signal from the RLL decoder 188 is provided to C1 190 and C2 192 decoders to provide error correction and detection.

Figure 5:
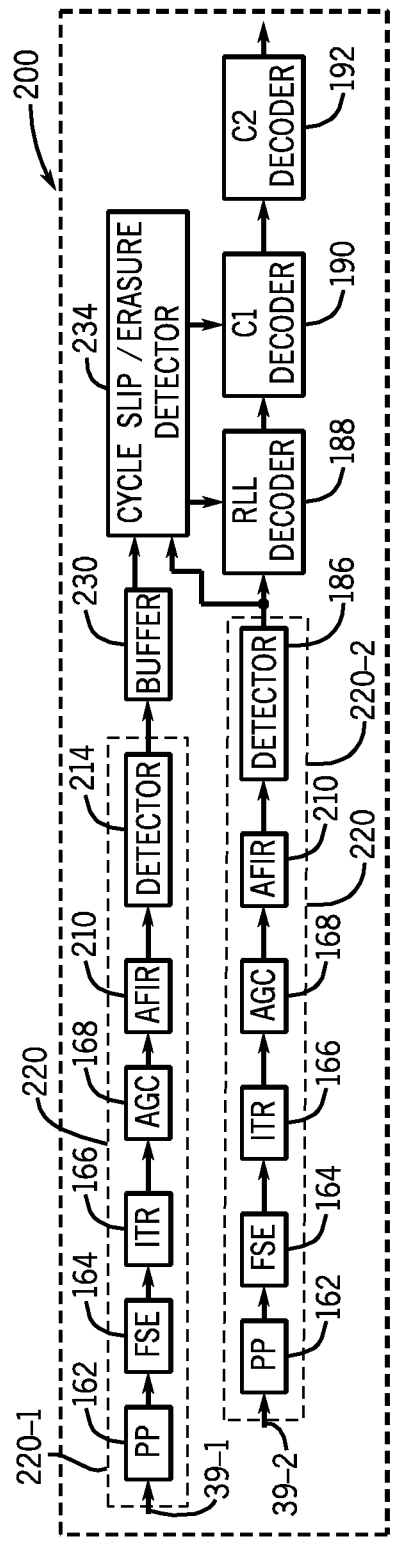

As a further implementation, a read architecture 200 that is depicted in FIG. 5 may be employed for each set of read elements 32 per track 15, in accordance with some implementations. In general, the read architecture 200 includes channels 220-1 and 220-2, sharing a common architecture 220, to replace the channels 160. In general, the channel 220 includes a pre-processor 162, FSE 164, ITR unit 166 and the AGC 168, as disclosed above. Moreover, the output of the AGC 168 is furnished to a filter 210, which provides this output to a detector 214. Under the architecture 150, the architecture 200 uses the channel 220-1 for a given read element 32 to control a cycle slip/erasure detector 234. In this regard, an output signal from the channel 220-1 is buffered by a buffer 230 before being provided to the cycle slip/erasure detector 234. The detector 234, in turn, compares this signal with the output signal from the channel 220-2. Based on the results of the cycle slip/erasure detection, the detector 234 controls an RLL decoder, C1decoder 192 and C2 decoder, which process the output of the channel 220-2.

Figure 6:
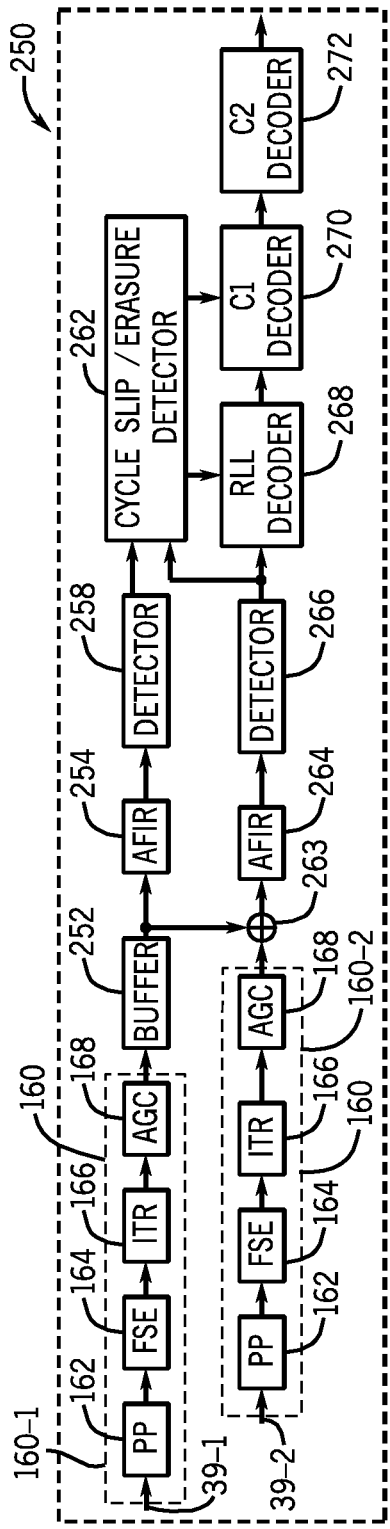

In further implementations, an architecture 250 that is depicted in FIG. 6 may be employed for each set of read elements 32 per track 15. The architecture 250 includes channels 160-1 and 160-2. A buffer 252 receives the output signals from the channel 160-1 and provides the buffered signal to an adder 263, which combines the signal with the output signal from the channel 160-2. The resulting combined signal is furnished to a filter 264, detector 266, RLL detector 268, C1decoder 270 and C2 decoder 272. The RLL decoder 268 and C1 decoder 270, in turn, are controlled by a cycle slip/erasure detector 262. In this regard, in addition to being provided to the adder 263, the output signal from the buffer 252 is also furnished to a filter 254, which provides a filter signal to a detector 258, and the output of the detector 258 is provided to the cycle slip/erasure detector 262. The detector 262 compares the output of the detectors 258 and 266 for purposes of generating the control signals for the RLL decoder 268 and the C1 decoder 270.

Figure 7:
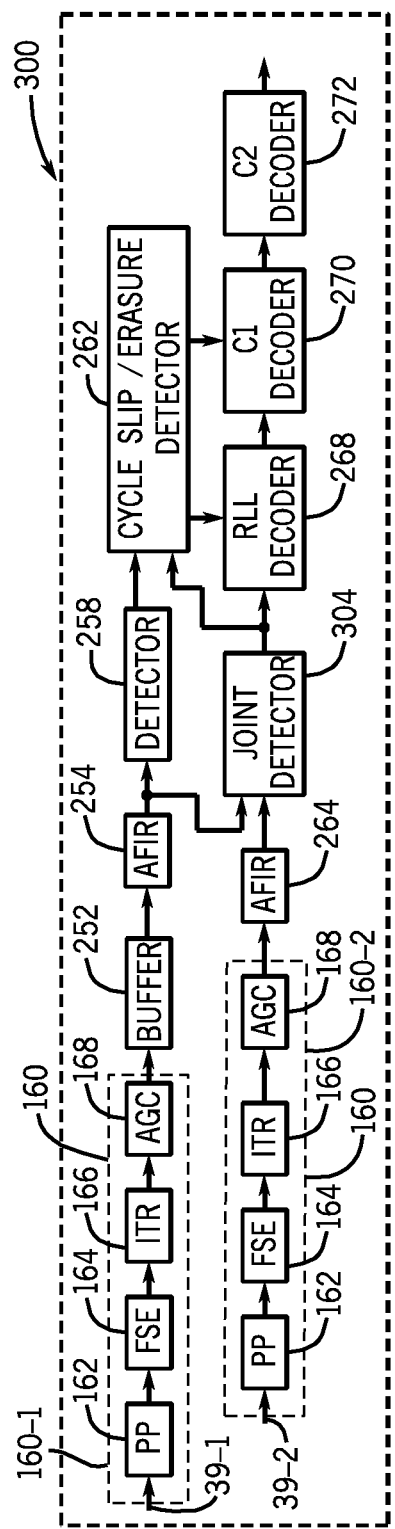

As yet another example, a read architecture 300 that is depicted in FIG. 7 may be employed for each set of read elements 32 per track 15, in accordance with some implementations. The architecture 300 has a similar design to the architecture 250 of FIG. 6, with the following differences. In particular, instead of employing the detector 266, the architecture 300 includes a joint detector 304, which compares an output of the filter 254 with an output of the filter 264 for purposes of generating a signal that is provided to the RLL decoder 268 and to the cycle slip/erasure detector 262.

Many other variations are contemplated and are within the scope of the appended claims. In this manner, the ITR 166 of the channel 160-1 of the architecture 150 of FIG. 4 may be used to control the ITR 166 of the channel 160-2. Moreover, for this implementation, the AGC 168 of the channel 160-1 may be used to control the AGC 168 of the channel 160-2. As another variation, the ITRs 166 of the two channels 160-1 and 160-2 may be formed from a joint ITR that performs the ITR functions for both paths 160-1 and 160-2. Also, for this implementation, a joint AGC 168 may be shared between the channels 160-1 and 160-2. Likewise, the architecture of FIG. 5 may be varied, in that the ITR of the channel 220-1 may control the ITR 166 of the channel 220-2, and the AGC 168 of the channel 220-1 may control the AGC 168 of the channel 220-2, in accordance with some implementations. Moreover, in accordance with some implementations, the ITR 166 and the AGC 168 may be shared in the architecture 200 in further implementations.

Moreover, the similar modifications may be made to the architecture 300 of FIG. 7, in accordance with some implementations.

Figure 8:
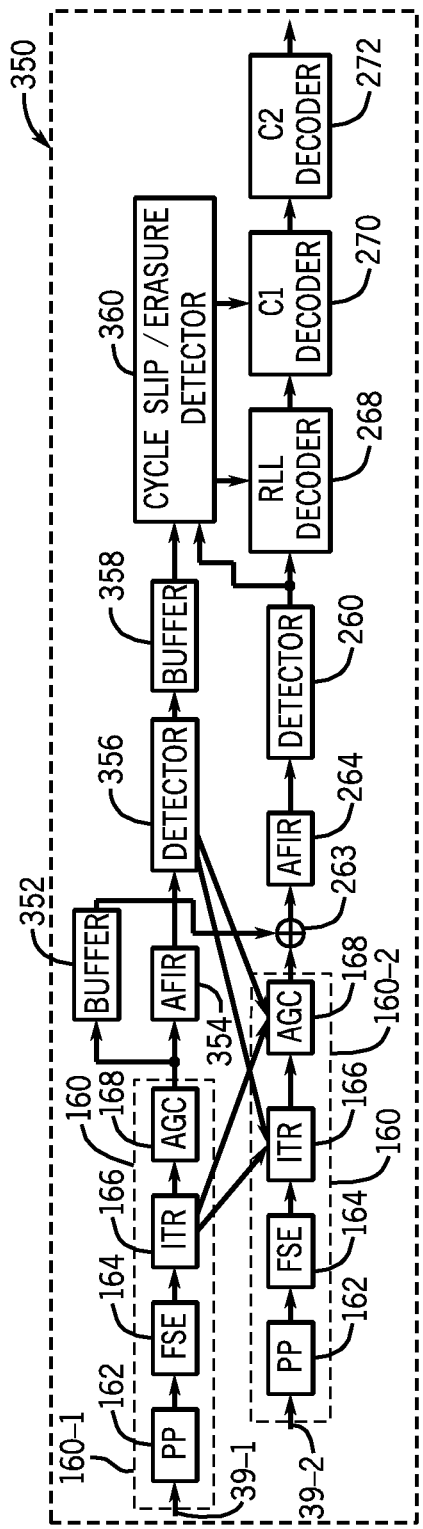

As yet another variations, FIG. 8 depicts an architecture 350 in accordance with further implementations. The architecture 350 has a similar design to the architecture 250 of FIG. 6, with similar reference numerals being used to denote similar elements, with the following differences. In particular, for the architecture 350, the output signal from the channel 160-1 is provided to a buffer 352 (in lieu of the buffer 252), which provides its output signal to the adder 263; and the output signal from the channel 160-1 of the architecture 350 is also provided in parallel to a filter 354 that provides its filtered signal to a detector 356. The output of the detector 356, in turn, is furnished to a buffer 358, which provides its output signal to a cycle slip/erasure detector 360. As shown in FIG. 8, in accordance with some implementations, the ITR 166 of the channel 160-2 may be controlled by the ITR 166 and detector 356; and the AGC 168 of the channel 160-2 may be controlled by the AGC 168 of the channel 160-1 and the detector 356.

Figure 9:
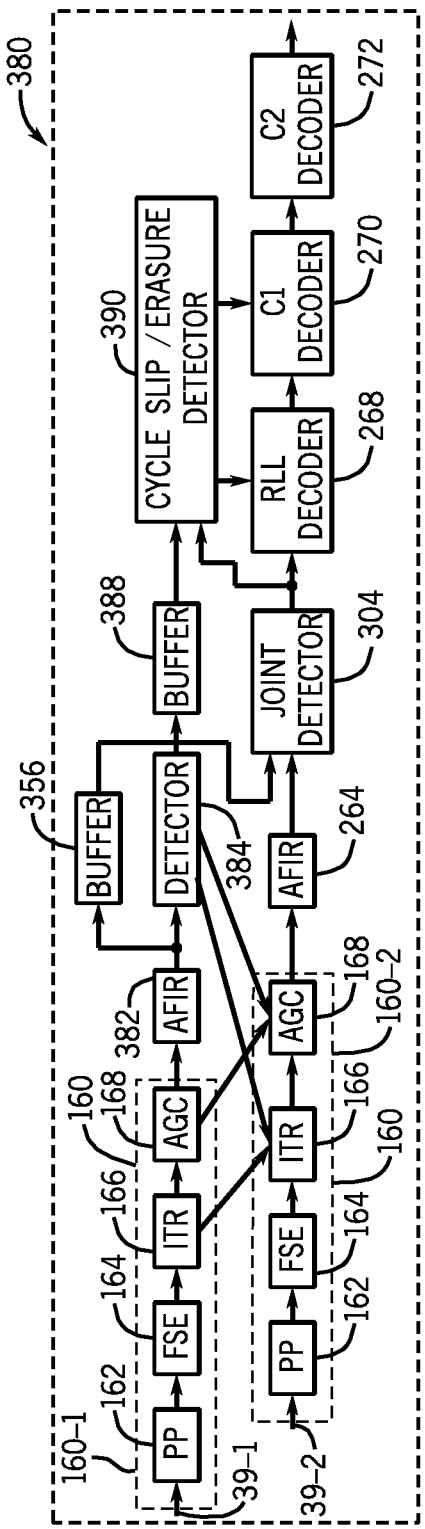

Referring to FIG. 9, as yet a further variation, an architecture 380 may be used in accordance with some implementations. In general, the architecture 380 has a similar design to the architecture 350 of FIG. 8, with the following variations. For this variation, the output of the channel 160-1 is provided to a filter 382, which in turn, provides a signal in parallel to a buffer 386 and a detector 384. The output of the buffer 386, in turn, is provided to a joint detector 304, and the output of the detector 384 is provided to a buffer 388, which furnishes a signal to a cycle slip/erasure detector 390. A filter 264 receives the output from the channel 160-2 and provides the other signal to the joint detector 304, which compares the two input signals to generate a signal that is provided to the cycle slip/erasure detector 390 and the RLL decoder 268. Moreover, as shown in FIG. 9, in accordance with some implementations, the ITR 166 of the channel 160-2 may be controlled by the ITR 166 of the channel 160-1 and the detector 384. Moreover, the AGC 168 of the channel 160-2 may be controlled by the AGC 168 of the channel 160-1 and the detector 384. Thus, many variations are contemplated, which are within the scope of the appended claims.

Among the potential advantages of the systems and techniques that are disclosed herein, multiple copies of data are available to detect errors locations, using ECC error detection in each stream of data and comparing for errors in the data set. Correcting the errors in one data stream with the information from an additional data stream may effectively at least double the error correction capacity of the primary level of ECC code. Additional layers of ECC effectiveness improve as the amount of identified "erasures" into those additional ECC layers are significantly reduced due to improved error correction from the primary ECC encoding. The general redundancy of data significantly improves performance when the tape drive operates in an environment where data from any data stream is significantly degraded.

The improvement may be a significant benefit when tape dimensional stability (TDS) is a concern. This improved read back performance may be a significant advantage in low SNR recording systems or where storage capacity is near its limit.

By controlling the distance between the sets of read elements 32 per track 15, other additional benefits may be available. In this manner, by packing a multiple reader element structure in the center bump of the tape drive 10 and optimizing the distance between the elements 32, tape azimuth problems may be substantially eliminated or significantly reduced when sets of reader element structures are all packed together and controlled by a precise separation that is well within the azimuth of induced geometrical errors. By minimizing the separation, a reasonable buffer size may be maintained for data alignment requirements.

The frequency response characteristics of instantaneous speed variation (ISV) events may be detected in different ways when an optimized distance is selected between the reader elements 32. This may be used in an ITR design for the tape drive 10 in which the detecting loop is relatively robust to short media defects and high frequency ISV events that are beyond the bandwidth of the ITR loop. One architectural configuration for ITR is to use multiple input data going into the loop where the Mueller-Mueller phase detector may make a better decision by processing multiple input data all aligned by buffers to estimate the synchronization clock frequency, which is enhanced due to the relatively high SNR. The other benefit to optimize the reader element separations are to improve cycle slip and synchronization field detections which are enhanced by the relatively high SNR. By optimizing the distance between the reader elements based on the C1 ECC power, erasures going into the C1 engine may be identified, therefore resulting in the C1 to be used as the erasure decider with doubling its ECC power without requiring format change.

Use of multiple read data may also be utilized by the Viterbi detection logic if the buffer synchronized input data samples are fed to the sequence detector logic enabling the multi input single output detector designs which further improves the robustness of the detectors especially with data dependent and/or noise predictive methodologies. Although basic concept would at minimum require multiple copies of the same detector circuitry from analog section all the way to C1 engine, this is not necessarily the only architectural configuration.

While a limited number of examples have been disclosed herein, those skilled in the art, having the benefit of this disclosure, will appreciate numerous modifications and variations therefrom. It is intended that the appended claims cover all such modifications and variations.

What is claimed is:

1. A method comprising:
   in a data storage device, sensing a plurality of data streams from a track of tape storage media as the media moves in a given direction using a plurality of read elements; and
   combining the data streams to generate a constructed data stream indicating data read from the track, wherein combining the data streams comprises selecting portions from the data streams containing valid data and being associated with different time segments of the constructed data stream and combining the selected portions to generate the constructed data stream, wherein combining the data streams comprises:
      applying error correction code (ECC)-based detection to the sensed data streams; and
      selectively combining the sensed data streams based on a result of the ECC-based detection.

2. The method of claim 1, wherein sensing the plurality of data streams comprising:
   offsetting the plurality of read elements relative to each other such that each of the read elements senses a given portion of the media at a different time as the media moves in the given direction; and
   selectively delaying at least one of the plurality of data streams to compensate for the offsetting.

3. The method of claim 1, wherein combining the plurality of signals comprises adding the plurality of signals together generate the data stream indicating data read from the track.

4. The method of claim 1, wherein sensing the plurality of data streams comprises:
   using a plurality of read elements spaced apart and aligned to sense a track of the storage media.

5. The method of claim 1, further comprising using the sensing and the generating to enhance a signal-to-noise ratio of the data read from the track.

6. A data storage device, comprising:
   a plurality of read elements arranged to read data from a track of magnetic media shared in common as the media moves in a given direction to generate a plurality of read data streams; and
   a read path to apply error correction code (ECC)-based detection to the read data streams and selectively combine the read data streams to provide a composite read data stream indicative of the data read from the track based on a result of the ECC-based detection, wherein combining the read data streams comprises selecting portions from the read data streams containing valid data and being associated with different time segments of the composite data stream and combining the selected portions to generate the composite read data stream.

7. The data storage device of claim 6, wherein the plurality of read elements are offset relative to each other such that each of the read elements senses a given portion of the media at a different time as the media moves in the given direction.

8. The data storage device of claim 6, wherein the read path is adapted to combine adding the read data streams together.

9. The data storage device of claim 6, wherein read elements comprise a plurality of read elements spaced apart and aligned to sense a track of the storage media.

10. The data storage device of claim 6, wherein the read path is adapted to use the sensing and the generation to enhance a signal-to-noise ratio of the data read from the track.

11. An article comprising a non-transitory computer readable storage medium to store instructions that when executed by a computer cause the computer to:
    in a data storage device, sense a plurality of data streams from a track of tape storage media as the media moves in a given direction using a plurality of read elements
    select portions from the data streams containing valid data and being associated with different time segments of a constructed data stream;
    apply error correction code (ECC)-based detection to the sensed data streams; and
    selectively combine the selected portions to generate the constructed data stream based on a result of the ECC-based detection.

* * * * *